(12) United States Patent
Cochran (10) Patent No.: US 10,935,380 B2
(45) Date of Patent: Mar. 2, 2021

(54) LEVELING TOOL

(71) Applicant: PERPETUAL MOTION COMPANY, Surprise, AZ (US)

(72) Inventor: Jack Walter Cochran, Surprise, AZ (US)

(73) Assignee: Perpetual Motion Company, Surprise, AZ (US)

( * ) Notice: Subject to any disclaimer, the term of this patent is extended or adjusted under 35 U.S.C. 154(b) by 188 days.

(21) Appl. No.: 16/333,494

(22) PCT Filed: Sep. 18, 2017

(86) PCT No.: PCT/US2017/052000
§ 371 (c)(1),
(2) Date: Mar. 14, 2019

(87) PCT Pub. No.: WO2018/053393
PCT Pub. Date: Mar. 22, 2018

(65) Prior Publication Data
US 2019/0257649 A1   Aug. 22, 2019

Related U.S. Application Data

(60) Provisional application No. 62/396,083, filed on Sep. 16, 2016.

(51) Int. Cl.
| | |
|---|---|
| G01C 9/34 | (2006.01) |
| G01C 9/28 | (2006.01) |
| G01C 9/26 | (2006.01) |
| G01C 9/24 | (2006.01) |

(52) U.S. Cl.
CPC ............... *G01C 9/28* (2013.01); *G01C 9/24* (2013.01); *G01C 9/26* (2013.01); *G01C 9/34* (2013.01)

(58) Field of Classification Search
CPC ........................................................ G01C 9/28
USPC ................................................... 33/347, 383
See application file for complete search history.

(56) References Cited

U.S. PATENT DOCUMENTS

| | | | |
|---|---|---|---|
| 449,609 A | 3/1891 | Green | |
| 2,519,107 A | 8/1950 | Brown | |
| 2,842,863 A | 7/1958 | Hellwig | |
| 2,968,873 A | 1/1961 | Holderer | |
| 3,707,772 A * | 1/1973 | Cotter | G01C 9/16 33/373 |
| 3,832,782 A * | 9/1974 | Johnson | G01C 9/28 33/451 |
| 4,394,799 A | 7/1983 | Moree et al. | |
| 4,501,057 A * | 2/1985 | Palomera | G01C 9/28 33/371 |
| 4,785,544 A * | 11/1988 | Heinsius | B25H 1/0085 33/334 |
| 4,986,002 A * | 1/1991 | Oros | B23K 9/287 33/334 |

(Continued)

*Primary Examiner* — George B Bennett
(74) *Attorney, Agent, or Firm* — Rodney J. Fuller; Booth Udall Fuller, PLC (57) ABSTRACT

A leveling tool is disclosed having a clamp that attaches to tubing, plumbing or other objects to determine whether the object is horizontally level or vertically plumb. The clamp of the leveling tool is capable of attaching to an object with the use of a single hand and/or is capable of remaining attached to an object without requiring a hand to hold the leveling tool.

20 Claims, 3 Drawing Sheets

(56) References Cited

U.S. PATENT DOCUMENTS

| | | | | |
|---|---|---|---|---|
| 5,207,004 | A | * | 5/1993 | Gruetzmacher ......... G01C 9/28 33/373 |
| 5,402,579 | A | | 4/1995 | Smith |
| 5,800,099 | A | | 9/1998 | Cooper |
| 5,819,425 | A | * | 10/1998 | Payne ..................... F16B 2/06 33/370 |
| 6,131,298 | A | | 10/2000 | McKinney et al. |
| 6,332,276 | B1 | * | 12/2001 | Mangel ............... G01C 15/008 33/273 |
| 6,839,983 | B2 | | 1/2005 | Woodward |
| 7,117,606 | B2 | * | 10/2006 | Brown ................... G01C 9/28 33/365 |
| 7,243,435 | B2 | * | 7/2007 | Morrissey ............... G01C 9/28 33/365 |
| 10,709,279 | B1 | * | 7/2020 | Hammer ................ A47H 1/142 |
| 2008/0271331 | A1 | | 11/2008 | Allemand |
| 2012/0151785 | A1 | * | 6/2012 | Lettkeman ............. G01C 9/24 33/301 |
| 2013/0283625 | A1 | * | 10/2013 | Sullivan .................. G01C 9/28 33/371 |

* cited by examiner

LEVELING TOOL

RELATED APPLICATION

This application is the U.S. National Stage of International Application No. PCT/US2017/052000, filed Sep. 18, 2017, which claims priority to and the benefit of U.S. Provisional Application No. 62/396,083, Sep. 16, 2016, titled "LEVELING TOOL," the contents of each of which are herein expressly incorporated by reference for all purposes in its entirety.

BACKGROUND

Technical Field

Aspects of this document relate generally to a leveling tool with a clamp that attaches to tubing, plumbing conduits, or other objects that fit within the clamp.

Background

Leveling tools of various types are frequently used by plumbers and carpenters to help determine if something is horizontally level or vertical. A leveling tool is placed on a pipe, brick, or board to determine if the object is level. Because plumbers and other tradesmen may commonly have only one hand free as they are working, a need exists for a leveling tool that operates with just one hand or in a hands-free mode allowing both hands to perform another task.

SUMMARY

A need exists for improved leveling tools to help determine if an object is horizontally level or vertical. Accordingly, in an aspect a leveling tool includes: a body having a first end portion, a second end portion, a base, and two or more side surfaces between the first and second end portions; a notch in a central portion of the base of the body, the notch running from the first end portion to the second end portion of the body; a first level coupled to the body approximately parallel to a long axis of the notch; a second level coupled to the body approximately orthogonal to the first level; a clamp assembly affixed to the base, the clamp assembly comprising a first clamp and a second clamp; a first tightening member having a first head and a first shank end portion opposite the first head, wherein the first tightening member is threadedly coupled to a first aperture in the first clamp with the first shank end portion positioned between the first aperture and the notch; and a second tightening member having a second head and a second shank end portion opposite the second head, wherein the second tightening member is threadedly coupled to a second aperture in the second clamp with the first shank end portion positioned between the first aperture and the notch.

In another aspect, a leveling tool includes: a body having a first end portion, a second end portion, and at least a first, second, and third side surface between the first and second end portions; a notch in a central portion of the first side surface of the body, the notch running from the first end portion to the second end portion of the body; a first level coupled to the body approximately parallel to the first side surface; a second level coupled to the body approximately parallel to the first side surface and approximately orthogonal to the first level; a clamp assembly affixed to the first side surface, the clamp assembly comprising a threaded aperture in a clamp arm; and a tightening member having a head and a shank end portion opposite the head, wherein the tightening member is threadedly coupled to the threaded aperture with the shank end portion positioned between the threaded aperture and the notch.

In a further aspect, a leveling tool includes: a body having a first end portion, a second end portion, a base, and two or more side surfaces between the first and second end portions; a notch in the base of the body, the notch running from the first end portion to the second end portion of the body; a first level coupled to the body approximately parallel to the base; a second level coupled to the body approximately parallel to the base and approximately orthogonal to the first level; a clamp assembly affixed to the body, the clamp assembly comprising a clamp arm; and a tightening member coupled to the clamp arm, wherein the tightening member is opposite the base and configured to clamp a cylindrical-shaped object between the tightening member and the notch.

In some aspects, the first clamp is proximate the first end portion and the second clamp is proximate the second end portion. In certain aspects, the leveling tool further includes a first flexible bumper coupled to the first shank end portion; and a second flexible bumper coupled to the second shank end portion. In further aspects, the notch has a depth of between 2 mm and 15 mm relative to the base.

In some aspects, the body further includes: a first threaded aperture in the first end portion, the first threaded aperture having a diameter sized and shaped to allow the first level to be inserted into the base through the first threaded aperture; and a second threaded aperture proximate the second end portion, the second threaded aperture extending through one of the side surfaces, the second threaded aperture having a diameter sized and shaped to allow the second level to be inserted into the base through the second threaded aperture. In certain aspects, the body further includes: a first set screw mated and removably coupled to the first threaded aperture, the first set screw seating the first level between an interior surface of the body and a seat of the first set screw when the first set screw is coupled to the first threaded aperture; a second set screw mated and removably coupled to the second threaded aperture, the second set screw seating the second level between an interior surface of the body and a seat of the second set screw when the second set screw is coupled to the second threaded aperture. In further aspects, the body further includes: a first aperture in the first end portion; and a first set screw mated and removably coupled to the first aperture, the first set screw securing the first level within the body when the first set screw is coupled to the first aperture, wherein the first level is removable through the first aperture when the first set screw is uncoupled from the first aperture. In some aspects, the body further includes: a second aperture proximate the second end portion, the second aperture extending through one of the side surfaces; and a second set screw mated and removably coupled to the second aperture, the second set screw securing the second level within the body when the second set screw is coupled to the second aperture, wherein the second level is removable through the second aperture when the second set screw is uncoupled from the second aperture. In certain aspects, the body further includes: a first aperture in the first end portion; a first set screw mated and removably coupled to the first aperture, the first set screw seating the first level between an interior surface of the body and a seat of the first set screw when the first set screw is coupled to the first aperture; a second aperture proximate the second end portion; and a second set screw mated and removably coupled to the second aperture, the second set screw seating the second level between an interior surface of the body and a seat of the second set screw when the second set screw is coupled to the second aperture. In further aspects, the body further includes: a plurality of first level viewing apertures adjacent the first level, the plurality of first level viewing apertures exposing at least a majority of the first level to view from outside the leveling tool; and at least one second level viewing aperture adjacent the first level, the at least one second level viewing aperture exposing at least a majority of the second level to view from outside the leveling tool.

In some aspects, the first and second levels comprise spirit levels. In certain aspects, the clamp assembly is configured to clamp on to polyethylene tubing or cross-linked polyethylene tubing. In further aspects, the clamp assembly is configured to clamp on to polyethylene tubing or cross-linked polyethylene tubing, wherein the tubing has an inner diameter of between 0.2 inches and 2.5 inches. In some aspects, the clamp assembly is configured to clamp on to polyethylene tubing or cross-linked polyethylene tubing, the tubing having an inner diameter of approximately 0.25 inches, 0.5 inches, 0.625 inches, 0.75 inches, 1 inch, 1.25 inches, 1.5 inches, 1.625 inches, 1.75 inches, 2 inches, 2.25 inches, or 2.5 inches. In certain aspects, the clamp assembly is configured to manually clamp on to an object with the use of only one hand of a user. In further aspects, the clamp assembly is configured to remain clamped on to an object without the aid of the hands of a user.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures

DETAILED DESCRIPTION

This document features a leveling tool having a clamp that attaches to tubing, plumbing or other objects to determine whether the object is horizontally level, vertically plumb, or the like. The leveling tool includes at least one level (e.g., a bubble level, a spirit level, an electronic level, etc.) used to measure whether at least one axis of the leveling tool is level or plumb. The leveling tool may include one or more of: a level in a horizontal orientation, a level in a vertical orientation, or one or more levels in other orientations.

According to some aspects, a leveling tool contemplated herein is advantageous to previous leveling tools because the disclosed leveling tool provides all of the benefits of a traditional leveling tools (e.g., levels to determine horizontal level and/or plumb) while also being capable of attaching to an object with the use of a single hand and/or being capable of remaining attached to an object without requiring a hand to hold the leveling tool.

There are many features of leveling tool implementations disclosed herein, of which one, a plurality, or all features or steps may be used in any particular implementation.

In the following description, reference may be made to the accompanying Figures which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure.

Figure 1:
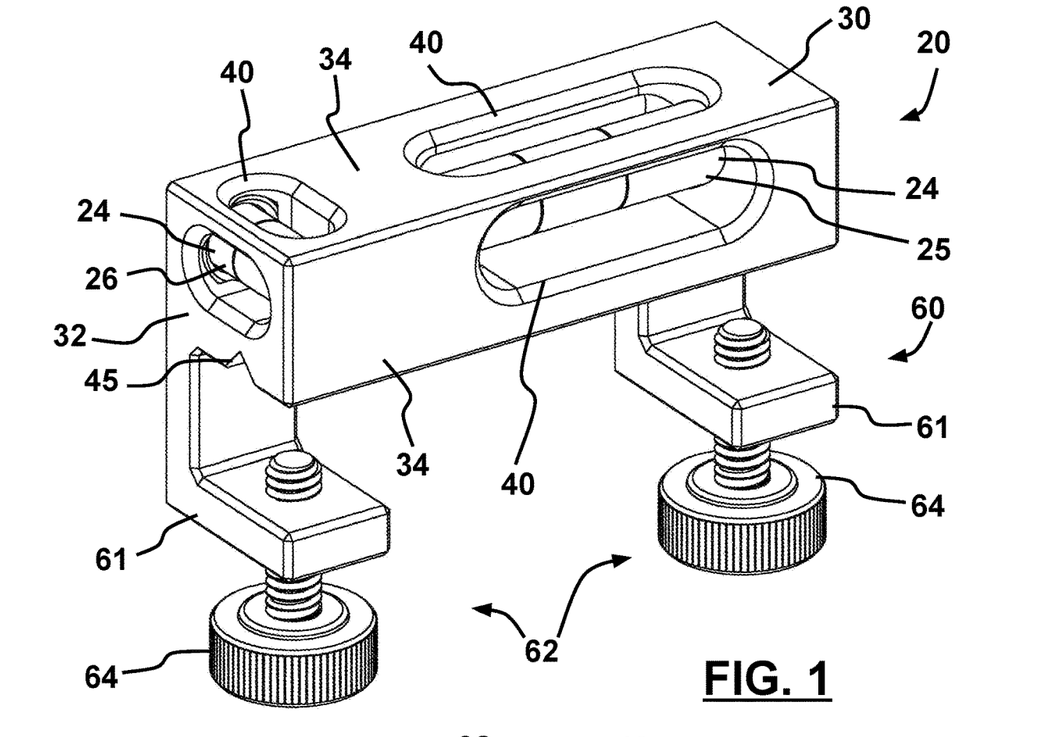
FIG. 1 is a front perspective view of a leveling tool according to the present disclosure.
Figure 2:
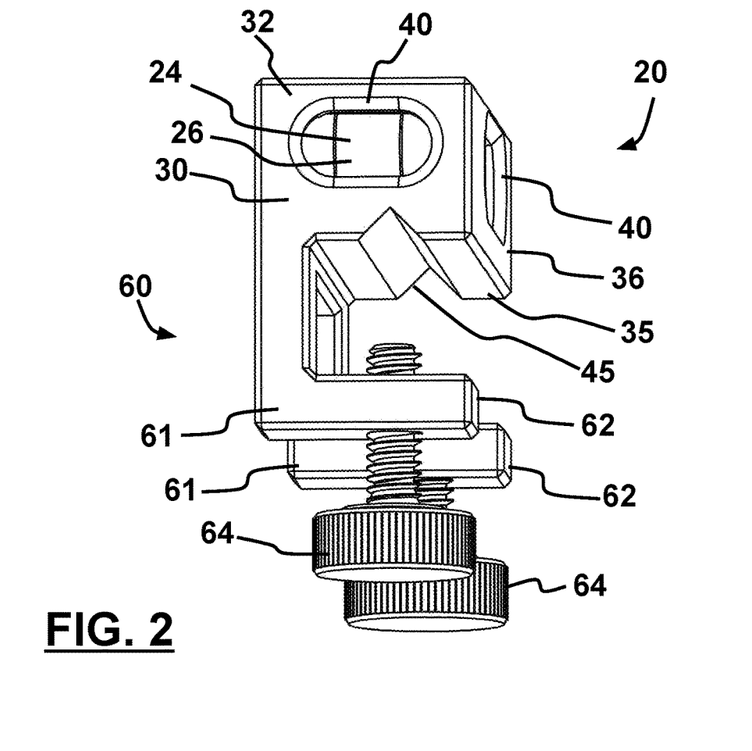
FIG. 2 is a side perspective view of the leveling tool of FIG. 1.
Figure 3:
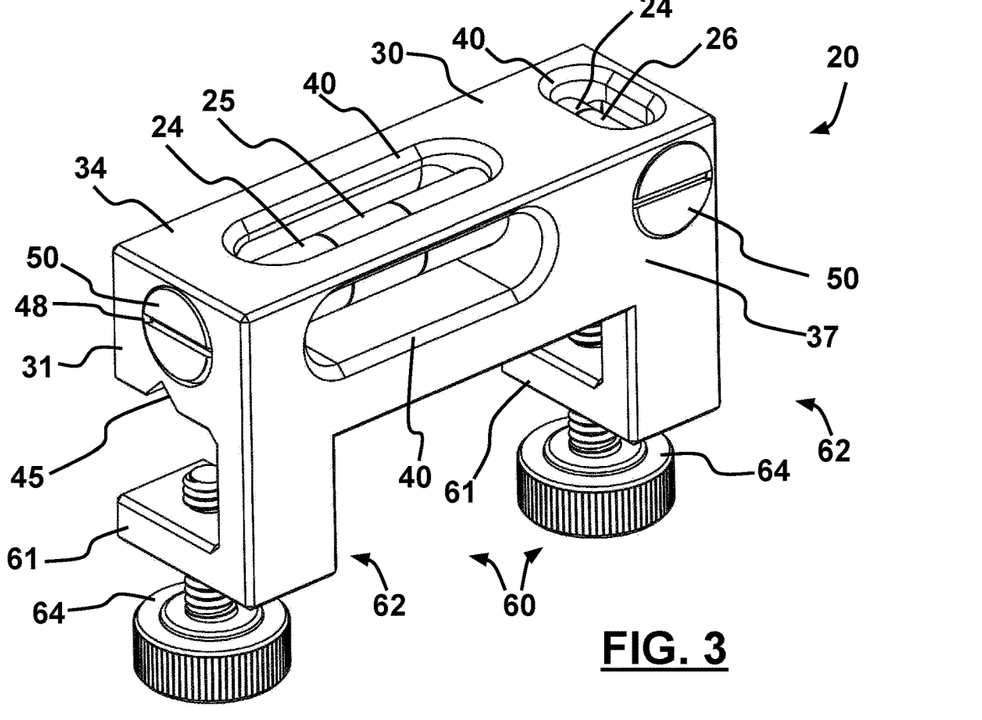
FIG. 3 is a rear perspective view of the leveling tool of FIG. 1.
Figure 4:
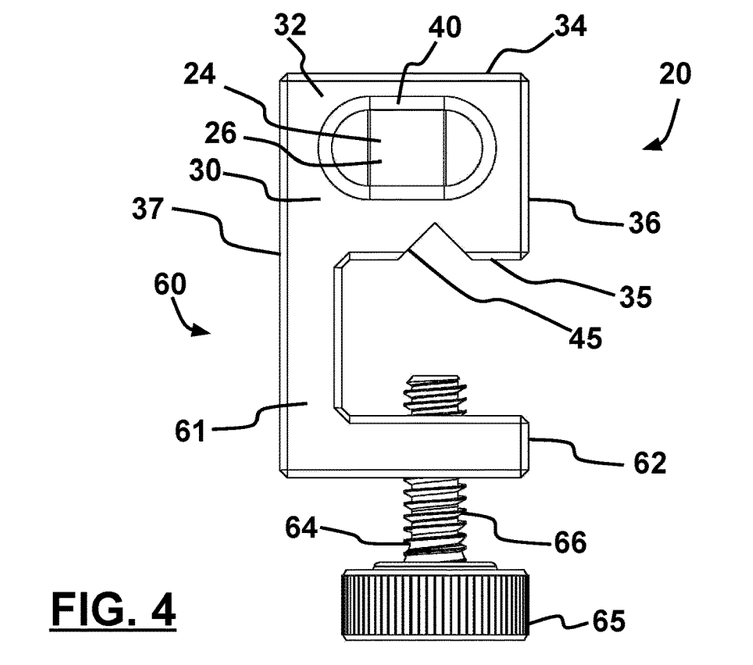
FIG. 4 is a side view of the leveling tool of FIG. 1.
Figure 5:
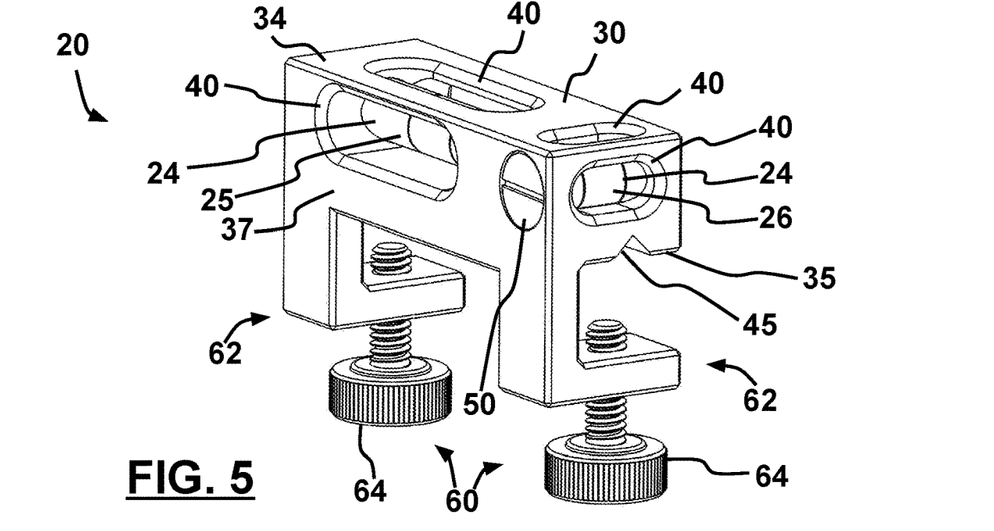
FIG. 5 is a rear perspective view of the leveling tool of FIG. 1.
Figure 6:
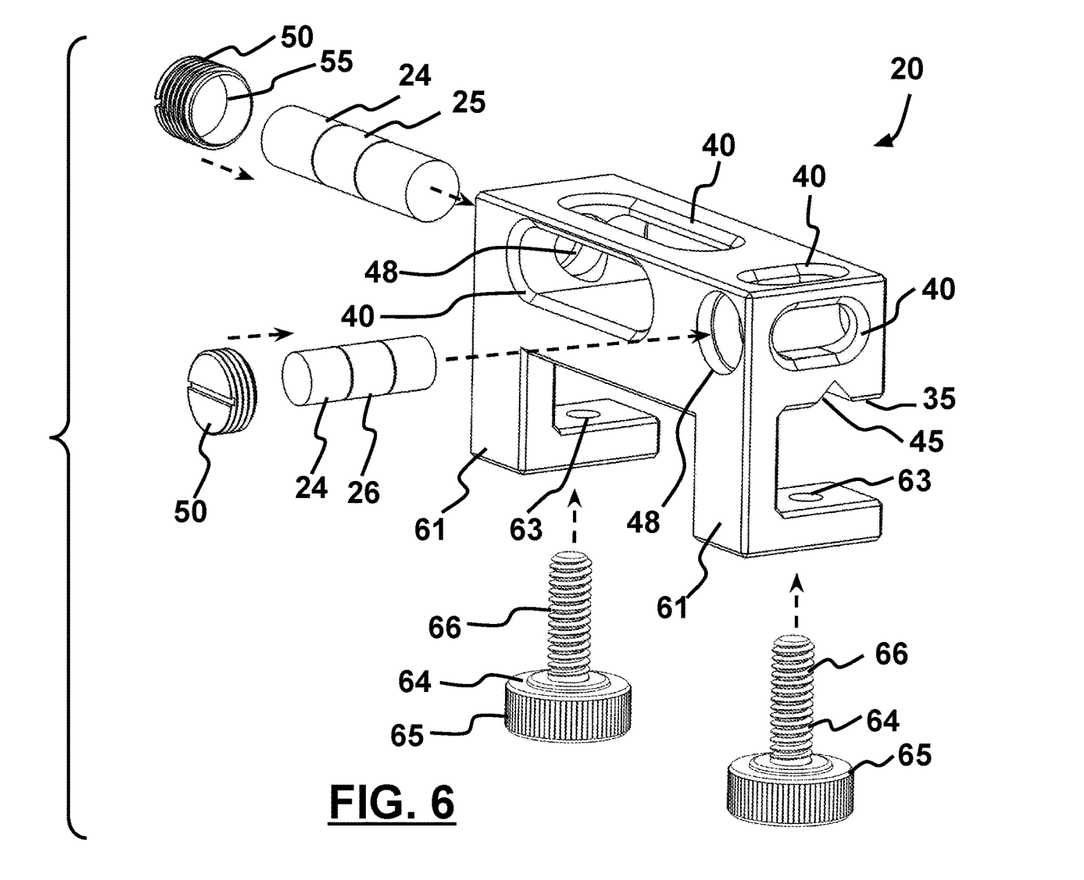
FIG. 6 is an exploded perspective view of the leveling tool shown in FIG. 5.

FIGS. 1-6 depict a leveling tool 20 that includes a clamp assembly 60 attached to a body 30 housing or coupled to at least one level 24. A level 24 may be any of various types of levels, including: a bubble level, a spirit level, a tubular spirit level, a bull's eye spirit level, a reed level, an all-way level, a laser level, an electronic level, a digital level, an inclinometer, an accelerometer, other levels, or another level yet to be developed. At least a portion of each level 24 is visible to a user. Because many types of levels 24 contain fragile elements (e.g., glass), a level 24 may be protectively housed within the body 30 with at least one window 40 allowing a user to see a portion of the level 24 that indicates the degree of level or plumb. In some implementations, the leveling tool 20 includes two levels 24 that are tubular spirit levels that are positioned orthogonal to each other (e.g., first level 25 and second level 26). The clamp assembly 60 includes at least one clamp 62 configured to releasably couple to an object to be measured (e.g., a tube, pipe, ledge, board, or bar). The clamp assembly 60 shown in FIGS. 1-6 is a non-limiting example of a clamp assembly 60 with two clamps 62. Each of the clamps 62 include clamp arm 61 with a threaded aperture 63 that mates with a threaded shank 66 of a tightening member 64. The tightening members 64 have a head 65 coupled to the threaded shanks 66 that allows a user to tighten the tightening members 64 by hand by rotating head 65 (e.g., head 65 may be an oversized and/or textured bolt head). In some implementations, the end of the tightening member 64 opposite the head 65 may include a polymer or rubber cap or bumper to reduce possible damage to an object held within the clamps 62 when the tightening member 64 is tightened.

In some implementations, a user is able clamp or otherwise fasten the clamp assembly 60 onto an object with the use of a single hand. In certain implementations, the leveling tool 20 is capable of remaining attached to an object without requiring a user's hand to hold the leveling tool.

In some implementations, the clamp assembly 60 includes two clamps 62. Each of the two clamps 62 may be near one of the two ends (e.g., first end 31 and second end 32). Each of the two clamps 62 includes a tightening member 64 configured to tighten down on an object. The clamp assembly 60 may be configured to clamp on to polyethylene tubing or cross-linked polyethylene (PEX) tubing (e.g., tubing with an inner diameter of between 0.2 inches and 2.5 inches). In some implementations, the clamp assembly 60 may be configured to clamp on to polyethylene tubing or cross-linked polyethylene tubing where the tubing has an inner diameter of approximately: 0.25 inches, 0.5 inches, 0.625 inches, 0.75 inches, 1 inch, 1.25 inches, 1.5 inches, 1.625 inches, 1.75 inches, 2 inches, 2.25 inches, or 2.5 inches.

In some implementations, the body 30 of the leveling tool 20 has two ends with at least three sides between the two ends. One of the sides of the body 30 is a base 35 that is configured to rest on or near the measured object. The clamp assembly 60 is attached to the base 35 or to another side, but extends around a portion of the base 35 so that a clamped object abuts or is close to the base 35. For example, the shape of the body 30 between the two ends may be triangular (three sides), square or rectangular (four sides), a hexagonal (six sides), and so forth. FIGS. 1-6 depict non-limiting implementations of a leveling tool 20 with a generally square or rectangular shape with four sides between the two ends, which are labeled as: first end 31, second end 32, top side 34, base 35, first side 36, and second side 37. The edge between any two sides and/or ends of the body 30 may be chamfered (as shown in FIGS. 1-6), rounded, or otherwise altered or removed. The body 30 may have a variety of rectilinear, curvilinear, cube, cuboid, cylindrical, hexagonal, prism, ellipsoid, or other regular or irregular three dimensional shapes and still serve the functions of: coupling to the clamp assembly 60 for clamping onto an object to be measured; housing or coupling to at least one level 24 for measuring the object; and providing a base 35 as a stable surface to abut the object being measured to allow for accurate and repeatable level/plumb measurements to be taken by a user.

A notch 45 runs along the base 35 from the first end 31 to the second end 32. The notch 45 may be "V" shaped as shown in FIGS. 1-6, however, the notch 45 may have a cross-sectional profile that is any angular, rectilinear, curvilinear, or irregular shape, whether symmetrical or asymmetrical, and is not required to be a "V" shape. The notch 45 may have a depth of between 2 mm and 15 mm relative to the base 35. A long axis of the notch 45 runs approximately parallel to the sides of the body 30. The notch 45 may run down a central portion of the base 35 (e.g., positioned somewhere within the middle $\frac{1}{3}^{rd}$, $\frac{1}{4}^{th}$, $\frac{3}{5}^{ths}$, or half of the base 35), but is offset from the centerline of the base 35. Alternatively, the notch 45 may run down the centerline of the base 35.

In numerous implementations, the leveling tool 20 is configured to clamp onto a cylindrically-shaped object (e.g., a tube, pipe, hose, conduit, or bar) and the notch 45 allows the cylindrically-shaped object to seat into the notch 45 to help reduce or prevent slippage of the object that is being measured. For example, a portion of a plumbing pipe will seat within the notch 45 as the tightening member(s) 64 of the clamp assembly 60 are tightened onto the plumbing pipe. A generally flat base 35 having a notch 45 can still clamp onto flat objects (e.g., ledges, boards, beams, etc.) because the flat surface of the base 35 is the primary surface frictionally coupling to the flat object rather than the depth or shape of the notch 45. Thus, a base 35 with a notch 45 can securely clamp onto a variety of different shaped objects to be measured.

At least one level 24 is housed entirely or substantially in or on the body 30. When multiple levels 24 are used, each level 24 is coupled to the body 30 and may be: housed entirely within the body 30; housed substantially (e.g., at least 60% by volume) within the body 30; and/or housed on the body 30. A first level 25 may be approximately parallel to the surface of the base 35 and/or the long axis of the notch 45. A second level 26 may be approximately parallel to the surface of the base 35 and approximately orthogonal to the long axis of the notch 45 and/or the first level 25. An additional level 24 may be approximately orthogonal to the surface of the base 35 and approximately orthogonal to both the first level 25 and the second level 26. Alternatively, an additional level 24 may be oriented at an angle of approximately 45°, 30°, or 60° away from the surface of the base 35, the first level 25, or the second level 26.

In preferred implementations, a first level 25 is parallel to the surface of the base 35 and/or the long axis of the notch 45. In preferred implementations, a second level 26 is parallel to the surface of the base 35 and orthogonal to the long axis of the notch 45 and/or the first level 25. In preferred implementations, an additional level 24 is orthogonal to the surface of the base 35 and orthogonal to both the first level 25 and the second level 26. As used herein, two levels 24 are oriented parallel to each other when the difference of the angle between the two levels 24 is: preferably 0° with a tolerance of ±7°; preferably 0° with a tolerance of ±5°; preferably 0° with a tolerance of ±3"; preferably 0° with a tolerance of ±1.5'; preferably 0° with a tolerance of ±1°; or preferably 0° with a tolerance of ±0.5°. As used herein, two levels 24 are oriented orthogonal to each other when the difference of the angle between the two levels 24 is: preferably 90° with a tolerance of ±7°; preferably 90° with a tolerance of ±5°; preferably 90° with a tolerance of ±3°; preferably 90° with a tolerance of ±1.5°; preferably 90° with a tolerance of ±1°; or preferably 90° with a tolerance of ±0.5°. Methods of manufacturing and material quality may affect the orientation of one or more levels 24 in the body 30, which may result in levels 24 that are not exactly parallel or orthogonal to each other, to the base 35, or to the long axis of the notch 45.

Each level 24 is at least partially visible to a user from the outside of the leveling tool 20, which allows the user to read the level/plumb measurement of the level 24 (e.g., seeing a bubble a spirit level). For levels 24 housed within the body 30, each level 24 is adjacent to at least one viewing aperture or window 40. Each viewing window 40 is sized and shaped to allow the user to see the measurement of the level 24 during use. A single level 24 may have multiple viewing windows 40. For example, FIGS. 1-6 depict an example of a leveling tool 20 with a first level 25 that has three viewing windows 40 (one on each of four sides, excluding the base 35) and a second level 26 with two windows 40 (one on the second end 32 and one on the top side 34). When multiple levels 24 are included in a single leveling tool 20, each level 24 may have the same or different number of viewing windows 40 and the viewing windows 40 may have different sizes and shapes (see, e.g., different sized windows 40 between the first level 25 and the second level 26 shown in FIGS. 1 and 3).

In some implementations, a level 24 is inserted into the body 30 through an aperture 48 and then secured in place by a set screw 50. The set screw 50 secures the level 24 in place by sandwiching the level 24 between an interior surface of the body 30 and the set screw 50. The set screw 50 may include a seat 55 or other cavity where an end portion of the level seats inside the seat 55 as the level 24 is sandwiched between the body 30 and the set screw 50. The seat 55 and the opposite interior surface of the body 30 may be manufactured more precisely than other portions of the leveling tool 20 to provide accurate orientation of the level 24 and thereby provide more accurate level/plumb measurements.

In some implementations, the clamp assembly 60 includes two clamps 62. Each of the two clamps 62 may be near one of the two ends (e.g., first end 31 and second end 32). Each of the two clamps 62 includes a tightening member 64 configured to tighten down on an object. The clamp assembly 60 may be configured to clamp on to polyethylene tubing or cross-linked polyethylene (PEX) tubing (e.g., tubing with an inner diameter of between 0.2 inches and 2.5 inches). In some implementations, the clamp assembly 60 may be configured to clamp on to polyethylene tubing or cross-linked polyethylene tubing where the tubing has an inner diameter of approximately: 0.25 inches, 0.5 inches, 0.625 inches, 0.75 inches, 1 inch, 1.25 inches, 1.5 inches, 1.625 inches, 1.75 inches, 2 inches, 2.25 inches, or 2.5 inches.

The clamp assembly 60 can clamp onto an object to be measured in a variety of different ways using one or more different types of clamps and other types of fasteners. For example, the clamp 62 does not necessarily need to employ a threaded shank 66 to tighten and secure the object to be measured in the clamp assembly 60. In some implementations, the clamp assembly 60 is constructed of a flexible material sized and shaped to clip on to a cylindrical tubing or pipe. In some implementations, two, three, or four different clamp assemblies protrude away from the body 30 of the leveling tool 20. For example, a second clamp assembly 60 may be added to the top side 34 of the body 30 where the first clamp assembly 60 (on the bottom of the body 30 in this example) is sized and shaped to fit around a particular range of tubing and the second clamp assembly 60 is sized and shaped to fit around a range of tubing either smaller or larger than the first clamp assembly 60.

It will be understood that leveling tool 20 implementations are not limited to the body 30 specific assemblies, devices and components disclosed in this document, as virtually any assemblies, devices and components consistent with the intended operation of a leveling tool 20 implementation may be utilized. Accordingly, for example, although particular levels, couplers, fasteners, clamps, and other assemblies, devices and components are disclosed, such may include any shape, size, style, type, model, version, class, measurement, concentration, material, weight, quantity, and/or the like consistent with the intended operation of a leveling tool 20 implementation. Implementations are not limited to uses of any specific assemblies, devices and components; provided that the assemblies, devices and components selected are consistent with the intended operation of a leveling tool 20 implementation.

Accordingly, the components defining any leveling tool 20 implementations may be formed of any of many different types of materials or combinations thereof that can readily be formed into shaped objects provided that the components selected are consistent with the intended operation of a leveling tool 20 implementation. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof.

For the exemplary purposes of this disclosure, sizing, dimensions, and angles of a leveling tool 20 implementations may vary according to different implementations.

Various leveling tool 20 implementations may be manufactured using conventional procedures as added to and improved upon through the procedures described here. Some components defining leveling tool 20 implementations may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that the assembly of leveling tools 20 are not limited to the specific order of steps as disclosed in this document. Any steps or sequence of steps of the assembly of leveling tools 20 indicated herein are given as examples of possible steps or sequence of steps and not as limitations, since various assembly processes and sequences of steps may be used to assemble leveling tools 20.

The leveling tool 20 implementations are described being used to determine the level of tubing, pipes, plumbing, bars, beams, boards, ledges, or other construction-related uses. Nevertheless, implementations are not limited to uses relating to the foregoing. Rather, any description relating to the foregoing is for the exemplary purposes of this disclosure, and implementations may also be used with similar results for a variety of other applications requiring the measurement of level or plumb. For example, implementations may be used to measure: machines; tripods; measurement equipment; appliances; machines with rotating assemblies; and so on.

What is claimed is:

1. A leveling tool, comprising:
    a body having a first end portion, a second end portion, a base, and two or more side surfaces between the first and second end portions;
    a notch in a central portion of the base of the body, the notch running from the first end portion to the second end portion of the body;
    a first level coupled to the body approximately parallel to a long axis of the notch;
    a second level coupled to the body approximately orthogonal to the first level;
    a clamp assembly affixed to the base, the clamp assembly comprising a first clamp and a second clamp;
    a first tightening member having a first head and a first shank end portion opposite the first head, wherein the first tightening member is threadedly coupled to a first aperture in the first clamp with the first shank end portion positioned between the first aperture and the notch; and
    a second tightening member having a second head and a second shank end portion opposite the second head, wherein the second tightening member is threadedly coupled to a second aperture in the second clamp with the first shank end portion positioned between the first aperture and the notch.

2. A leveling tool, comprising:
a body having a first end portion, a second end portion, and at least a first, second, and third side surface between the first and second end portions;
a notch in a central portion of the first side surface of the body, the notch running from the first end portion to the second end portion of the body;
a first level coupled to the body approximately parallel to the first side surface;
a second level coupled to the body approximately parallel to the first side surface and approximately orthogonal to the first level;
a clamp assembly affixed to the first side surface, the clamp assembly comprising a threaded aperture in a clamp arm; and
a tightening member having a head and a shank end portion opposite the head, wherein the tightening member is threadedly coupled to the threaded aperture with the shank end portion positioned between the threaded aperture and the notch.

3. A leveling tool, comprising:
a body having a first end portion, a second end portion, a base, and two or more side surfaces between the first and second end portions;
a notch in the base of the body, the notch running from the first end portion to the second end portion of the body;
a first level coupled to the body approximately parallel to the base;
a second level coupled to the body approximately parallel to the base and approximately orthogonal to the first level;
a clamp assembly affixed to the body, the clamp assembly comprising a clamp arm; and
a tightening member coupled to the clamp arm, wherein the tightening member is opposite the base and configured to clamp a cylindrical-shaped object between the tightening member and the notch.

4. The leveling tool of claim 1, wherein the first clamp is proximate the first end portion and the second clamp is proximate the second end portion.

5. The leveling tool of claim 1, further comprising:
a first flexible bumper coupled to the first shank end portion; and
a second flexible bumper coupled to the second shank end portion.

6. The leveling tool of claim 1, wherein the notch has a depth of between 2 mm and 15 mm relative to the base.

7. The leveling tool of claim 2, wherein the body further comprises:
a first threaded aperture in the first end portion, the first threaded aperture having a diameter sized and shaped to allow the first level to be inserted into the base through the first threaded aperture; and
a second threaded aperture proximate the second end portion, the second threaded aperture extending through one of the side surfaces, the second threaded aperture having a diameter sized and shaped to allow the second level to be inserted into the base through the second threaded aperture.

8. The leveling tool of claim 7, wherein the body further comprises:
a first set screw mated and removably coupled to the first threaded aperture, the first set screw seating the first level between an interior surface of the body and a seat of the first set screw when the first set screw is coupled to the first threaded aperture;
a second set screw mated and removably coupled to the second threaded aperture, the second set screw seating the second level between an interior surface of the body and a seat of the second set screw when the second set screw is coupled to the second threaded aperture.

9. The leveling tool of claim 1, wherein the body further comprises:
a first aperture in the first end portion; and
a first set screw mated and removably coupled to the first aperture, the first set screw securing the first level within the body when the first set screw is coupled to the first aperture, wherein the first level is removable through the first aperture when the first set screw is uncoupled from the first aperture.

10. The leveling tool of claim 9, wherein the body further comprises:
a second aperture proximate the second end portion, the second aperture extending through one of the side surfaces; and
a second set screw mated and removably coupled to the second aperture, the second set screw securing the second level within the body when the second set screw is coupled to the second aperture, wherein the second level is removable through the second aperture when the second set screw is uncoupled from the second aperture.

11. The leveling tool of claim 3, wherein the body further comprises:
a first aperture in the first end portion;
a first set screw mated and removably coupled to the first aperture, the first set screw seating the first level between an interior surface of the body and a seat of the first set screw when the first set screw is coupled to the first aperture;
a second aperture proximate the second end portion; and
a second set screw mated and removably coupled to the second aperture, the second set screw seating the second level between an interior surface of the body and a seat of the second set screw when the second set screw is coupled to the second aperture.

12. The leveling tool of claim 2, wherein the body further comprises:
a plurality of first level viewing apertures adjacent the first level, the plurality of first level viewing apertures exposing at least a majority of the first level to view from outside the leveling tool; and
at least one second level viewing aperture adjacent the first level, the at least one second level viewing aperture exposing at least a majority of the second level to view from outside the leveling tool.

13. The leveling tool of claim 2, wherein the first and second levels comprise spirit levels.

14. The leveling tool of claim 3, wherein the clamp assembly is configured to clamp on to polyethylene tubing or cross-linked polyethylene tubing.

15. The leveling tool of claim 1, wherein the clamp assembly is configured to clamp on to polyethylene tubing or cross-linked polyethylene tubing, wherein the tubing has an inner diameter of between 0.2 inches and 2.5 inches.

16. The leveling tool of claim 3, wherein the clamp assembly is configured to clamp on to polyethylene tubing or cross-linked polyethylene tubing, the tubing having an inner diameter of approximately 0.25 inches, 0.5 inches, 0.625 inches, 0.75 inches, 1 inch, 1.25 inches, 1.5 inches, 1.625 inches, 1.75 inches, 2 inches, 2.25 inches, or 2.5 inches.

17. The leveling tool of claim 1, wherein the clamp assembly is configured to manually clamp on to an object with the use of only one hand of a user.

18. The leveling tool of claim 3, wherein the clamp assembly is configured to remain clamped on to an object without the aid of the hands of a user.

19. The leveling tool of claim 3, wherein the notch has a depth of between 2 mm and 15 mm relative to the base.

20. The leveling tool of claim 2, wherein the clamp assembly is configured to clamp on to polyethylene tubing or cross-linked polyethylene tubing.

* * * * *